United States Patent
Takahashi et al.

(10) Patent No.: US 9,342,032 B2
(45) Date of Patent: May 17, 2016

(54) IMAGE FORMING APPARATUS

(71) Applicant: KONICA MINOLTA, INC., Chiyoda-ku, Tokyo (JP)

(72) Inventors: Michio Takahashi, Toyokawa (JP); Toshiyuki Tokuno, Toyokawa (JP); Kenji Taki, Fuchu (JP); Junichi Arai, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/634,570

(22) Filed: Feb. 27, 2015

(65) Prior Publication Data
US 2015/0248092 A1  Sep. 3, 2015

(30) Foreign Application Priority Data

Mar. 1, 2014  (JP) ................. 2014-040002

(51) Int. Cl.
G03G 21/02 (2006.01)
G07F 17/26 (2006.01)
G03G 15/00 (2006.01)
H04N 1/34 (2006.01)

(52) U.S. Cl.
CPC ............ *G03G 21/02* (2013.01); *G03G 15/5075* (2013.01); *G03G 2215/00109* (2013.01); *G07F 17/26* (2013.01); *H04N 1/34* (2013.01)

(58) Field of Classification Search
CPC .................................................. G03G 21/02
USPC ........................................................ 399/79
See application file for complete search history.

(56) References Cited

U.S. PATENT DOCUMENTS 5,956,698 A * 9/1999 Lacheze et al. ................. 705/34
7,519,307 B2 * 4/2009 Lovat et al. ..................... 399/79

(Continued)

FOREIGN PATENT DOCUMENTS

JP   2002215368 A   8/2002
JP   2002307788 A   10/2002

(Continued)

OTHER PUBLICATIONS

Japanese Office Action (and English translation thereof) dated Feb. 18, 2016, issued in counterpart Japanese Application No. 2014-040002.

*Primary Examiner* — Clayton E LaBalle
*Assistant Examiner* — Kevin Butler
(74) *Attorney, Agent, or Firm* — Holtz, Holtz & Volek PC

(57) ABSTRACT

An image forming apparatus includes a time setting unit that sets a print allowable time according to the amount of advance payment, a usage time count unit that counts a usage time and a print allowance determination unit that determines, from the time setting unit and the usage time count unit, whether printing is allowed or prohibited. Before the time counted by the usage time count unit reaches the print allowable time, the print allowance determination unit allows the printing to be performed whereas after the time counted by the usage time count unit reaches the print allowable time, the print allowance determination unit prohibits the printing from being performed.

22 Claims, 11 Drawing Sheets

(56) References Cited

U.S. PATENT DOCUMENTS

| | | | |
|---|---|---|---|
| 7,738,808 B2* | 6/2010 | Lovat et al. | 399/79 |
| 8,175,484 B2* | 5/2012 | Miyahara et al. | 399/79 |
| 8,301,524 B2* | 10/2012 | Fukata | 705/34 |
| 9,041,953 B2* | 5/2015 | Nakata | 358/1.14 |
| 2002/0152302 A1* | 10/2002 | Motoyama et al. | 709/224 |
| 2003/0014515 A1* | 1/2003 | Motoyama et al. | 709/224 |
| 2006/0078346 A1* | 4/2006 | Lovat et al. | 399/79 |
| 2009/0316185 A1* | 12/2009 | Imamura et al. | 358/1.15 |
| 2010/0306093 A1 | 12/2010 | Fukata | |
| 2015/0153674 A1* | 6/2015 | Shimotoso et al. | 399/79 |

FOREIGN PATENT DOCUMENTS

| | | | |
|---|---|---|---|
| JP | 2003256175 A | 9/2003 | |
| JP | 2003323643 A | 11/2003 | |
| JP | 2004005736 A | 1/2004 | |
| JP | 2005088312 A | 4/2005 | |
| JP | 2005196538 A | 7/2005 | |
| JP | 2008139402 A | 6/2008 | |
| JP | 2008-191436 * | 8/2008 | G03G 21/02 |
| JP | 2010277470 A | 12/2010 | |

* cited by examiner

F I G. 5
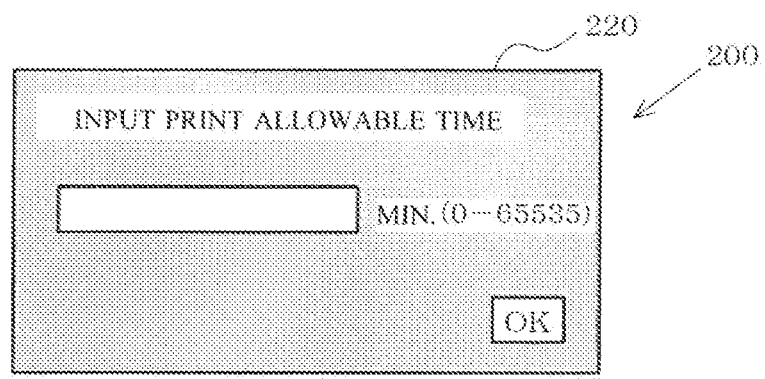

F I G. 1 3
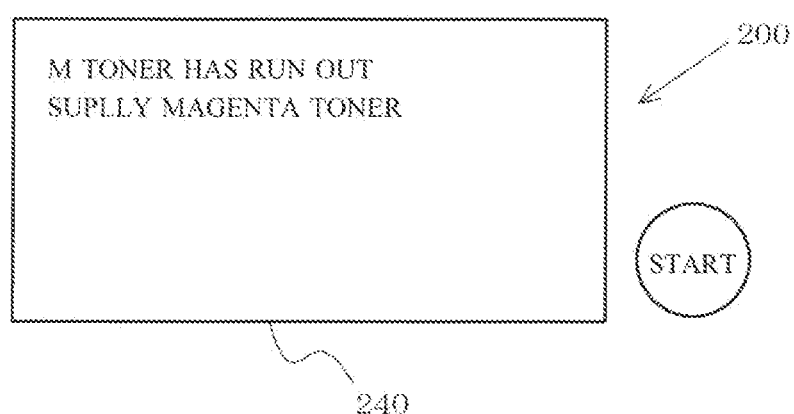
F I G. 1 4

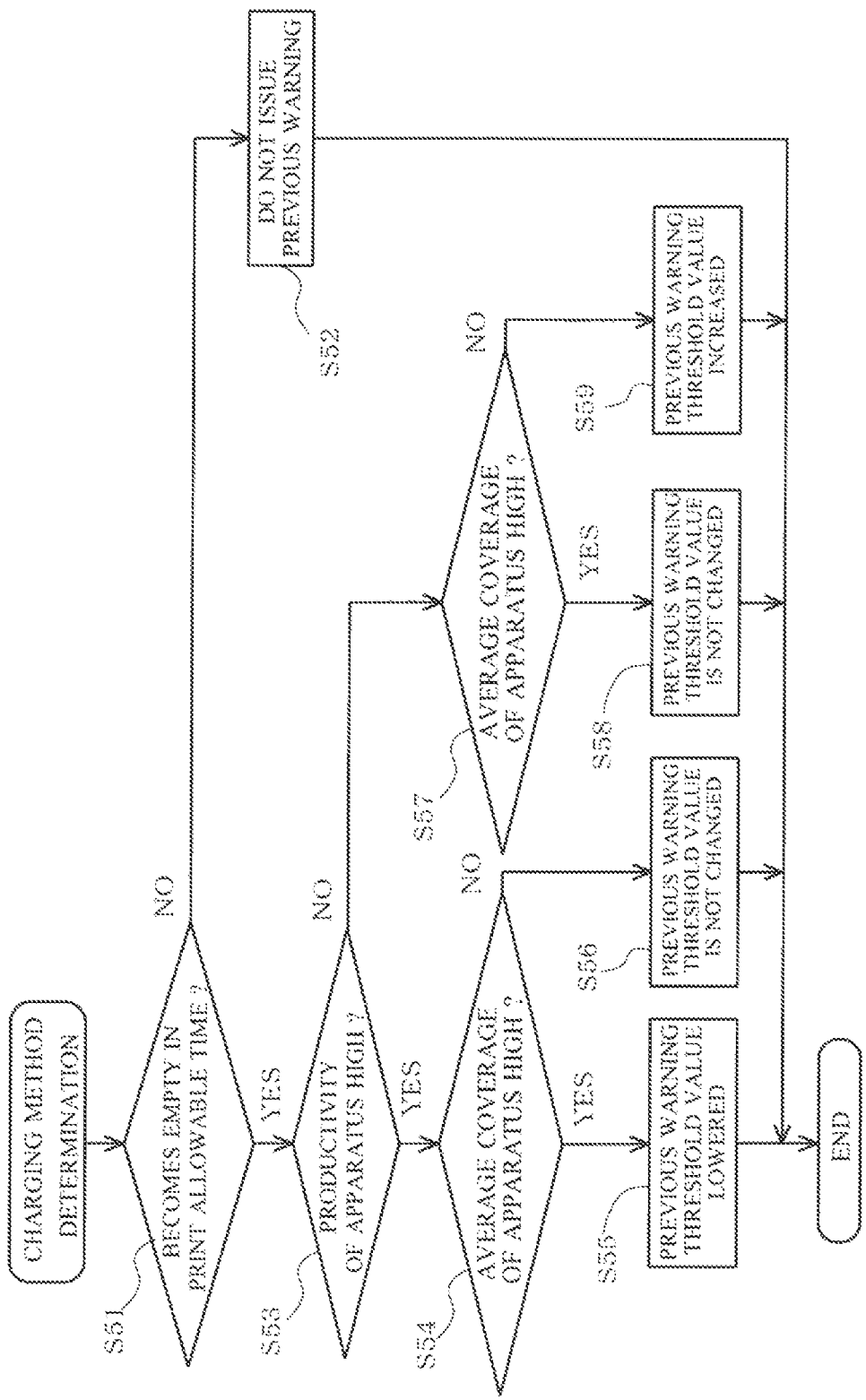

IMAGE FORMING APPARATUS

This application is based on Japanese Patent Application No. 2014-040002 filed on Mar. 1, 2014 the contents of which are hereby incorporated by reference.

BACKGROUND OF THE INVENTION

1. Field of the Invention

The present invention relates to an image forming apparatus, and more particularly to an image forming apparatus that adopts a time charging method.

2. Description of the Related Art

A copying machine that can be used by unspecified customers is set up in various types of stores such as a convenience store. A coin vendor or a prepaid card reading machine for charging is provided next to such a copying machine. A user previously pays the desired amount of money through the coin vendor or the prepaid card reading machine. Thus, it is possible to perform printing corresponding to the amount of money paid.

Since in such a number-of-sheet charging method, a charge is determined by the number of sheets printed, even when the same number of sheets are printed, a user who performs time-consuming printing increases the time during which the copying machine is occupied. Hence, for example, the subsequent user may give up the use of the copying machine because the user has been kept waiting for a long time. In this case, the manager who sets up the copying machine loses an opportunity to provide the copying machine.

On the other hand, there is a time charging method in which charging is performed according to the time during which the image forming apparatus is used. However, when charging is performed simply according to time, for example, a problem may occur in which the image forming apparatus does not operate as the user expects due to a paper jam or the like and thus the user is also charged for the time during which printing cannot be performed.

Hence, Japanese Unexamined Patent Application Publication No. 2005-88312 discloses a control configuration in which a detection unit that detects whether or not it is possible to satisfactorily perform printing processing is provided within an image forming apparatus and in which an actual usage time is measured based on the result of the detection. With this control configuration, it is not necessary for a user to make an unreasonable payment, and it is also not necessary for a set-up manager to perform a time management operation for measuring and determining the time during which printing cannot be performed.

Japanese Unexamined Patent Application Publication No. 2003-256175 proposes a control configuration in which a printing completion specified time or a completion time predicted through analysis of print data by an apparatus itself is compared with an actual completion time, and when the actual printing completion time is behind it, the charge is reduced. With this control configuration, it is possible to prevent a user from experiencing a disadvantage, and it is also possible to enhance convenience by providing notification to the user when the actual printing completion time is likely to be behind schedule.

However, in the conventional time charging method in which the charge is determined at the time of the completion of the use, though consideration is given to the present user, it may be inconvenient for the subsequent user. Specifically, while the previous customer is using the copying machine, it is impossible to find the scheduled completion time of the previous customer. Hence, since the subsequent customer does not find the waiting time, the subsequent customer needs to give up using the copying machine at that store or to come again to the store after a time which is guessed intuitively. The manager of the copying machine may lose an opportunity to provide the copying machine, and the copying machine may not be operated during the time for which the subsequent customer has come again to the store after the completion of the use by the previous customer.

Hence, an object of the present invention is to provide an image forming apparatus in which a time charging method is adopted and a use completion time is found.

SUMMARY OF THE INVENTION

According to the present invention, there is provided an image forming apparatus including: a time setting unit that sets a print allowable time according to an amount of advance payment; a usage time count unit that counts a usage time; and a print allowance determination unit that determines, from the time setting unit and the usage time count unit, whether printing is allowed or prohibited, where before the time counted by the usage time count unit reaches the print allowable time, the print allowance determination unit allows the printing to be performed whereas after the time counted by the usage time count unit reaches the print allowable time, the print allowance determination unit prohibits the printing from being performed.

The image forming apparatus according to the present invention, further includes: a charging method selection unit that selects a charging method from a number-of-sheet charging method of determining a charging amount according to a number of sheets to be printed and a time charging method of determining the charging amount according to the print allowable time; and a control setting unit that sets an operation state of the image forming apparatus, wherein when the time charging method is selected by the charging method selection unit, the control setting unit changes the operation state so as to maintain a print allowance state longer than when the number-of-sheet charging method is selected.

The image forming apparatus according to the present invention, further includes: an input portion with which a user sets and inputs a print condition; and an auto-clear unit that returns the print condition input from the input portion to a predetermined initial value, where when the time charging method is selected by the charging method selection unit, the auto-clear unit does not execute auto-clearing within the print allowable time.

Here, when the time charging method is selected by the charging method selection unit, the auto-clear unit may execute the auto-clearing when the print allowable time elapses. Alternatively, when the time charging method is selected by the charging method selection unit, the auto-clear unit may execute the auto-clearing at a start of the print allowable time.

Furthermore, the image forming apparatus according to the present invention, further includes: a completion input portion with which the user inputs print completion, where when the time charging method is selected by the charging method selection unit, and the print completion is input from the completion input portion, the auto-clear unit may execute the auto-clearing even within the print allowable time.

Moreover, the image forming apparatus according to the present invention, further includes: a time extension input portion with which the user inputs an extension of the print allowable time, where when the time charging method is selected by the charging method selection unit, and the extension of the print allowable time is input from the time extension input portion, the auto-clear unit preferably does not execute the auto-clearing within the print allowable time and within the extended print allowable time.

Moreover, the image forming apparatus according to the present invention, further includes: an auto-clear execution necessity determination input portion with which the user inputs a determination as to whether or not the auto-clearing needs to be executed within the print allowable time when the time charging method is selected by the charging method selection unit, where when the time charging method is selected by the charging method selection unit, and a determination that the auto-clearing needs to be executed is input from the auto-clear execution necessity determination input portion, the auto-clear unit preferably executes the auto-clearing, even within the print allowable time, after a predetermined time has elapsed since the setting and inputting from the input portion.

The image forming apparatus according to the present invention, further includes: a print allowance determination portion that determines, according to the state of the apparatus and a remaining amount of a consumable item, whether or not the printing can be performed; and a mode switching portion that switches a mode to any one of a standby mode in which a print instruction is waited for in a state where consumption of the apparatus is reduced, a print preparation mode in which a preparation operation for performing a printing operation from the standby mode is performed, a print allowable mode in which the printing can be performed and a standby preparation mode for returning to the standby mode after a predetermined time has elapsed since completion of the printing, where when the number-of-sheet charging method is selected by the charging method selection unit, if the print allowance determination portion determines that the printing can be performed and that a user sets and inputs a print condition, the mode switching portion switches the mode to the print preparation mode whereas when the time charging method is selected by the charging method selection unit, if the print allowance determination portion determines that the printing can be performed, the mode switching portion switches the mode to the print preparation mode.

Here, when the number-of-sheet charging method is selected by the charging method selection unit, if at least one of lack of a sheet, an end of a life of the consumable item, a paper jam, a failure and lack of a toner is detected, the print allowance determination portion preferably determines that the printing cannot be performed.

Moreover, the image forming apparatus according to the present invention, further includes: a supply detection unit that detects an operation of supplying the consumable item, where when the time charging method is selected by the charging method selection unit, if the print allowance determination portion determines that the printing cannot be performed due to lack of the remaining amount of the consumable item, and the supply detection unit detects the operation of supplying the consumable item, the mode switching portion preferably switches the mode to the print preparation mode.

The supply detection unit may be a unit that detects an operation of opening a paper feed port after the print allowance determination portion determines that the printing cannot be performed.

The supply detection unit may be a unit that detects an operation of opening a toner supply port after the print allowance determination portion determines that the printing cannot be performed.

The image forming apparatus according to the present invention, further includes: a mode switching portion that switches a mode to any one of a standby mode in which a print instruction is waited for in a state where consumption of the apparatus is reduced, a print preparation mode in which a preparation operation for performing a printing operation from the standby mode is performed and a print allowable mode in which the printing can be performed and a standby preparation mode for returning to the standby mode after a predetermined time has elapsed since completion of the printing; a post-print elapsed-time counter that counts a time which has elapsed since completion of the printing operation; and a time elapse determination unit that determines, with the post-print elapsed-time counter, whether or not a predetermined time is reached, where when the number-of-sheet charging method is selected by the charging method selection unit, if the time elapse determination unit determines that a first predetermined time has elapsed, the mode switching portion switches the mode to the print preparation mode whereas when the time charging method is selected by the charging method selection unit, if the time elapse determination unit determines that a second predetermined time has elapsed, the mode switching portion switches the mode to the print preparation mode, and the second predetermined time is equal to or more than the first predetermined time.

The second predetermined time is preferably equal to or less than a difference between the print allowable time and a print completion time.

The image forming apparatus according to the present invention, further includes: a stabilization control unit that controls an image quality stabilization operation for stabilizing an image quality in a standby state and during the printing, where the control of the image quality stabilization operation by the stabilization control unit preferably differs depending on whether the number-of-sheet charging method is selected or the time charging method is selected.

When the time charging method is selected by the charging method selection unit, the stabilization control unit preferably determines an operation condition of the image quality stabilization operation according to the print allowable time or the time counted by the usage time count unit.

Preferably, when the number-of-sheet charging method is selected by the charging method selection unit, each time a number of sheets printed reaches a predetermined number of sheets, the image stabilization operation is performed whereas when the time charging method is selected by the charging method selection unit, if the remaining print allowable time of a user is less than a predetermined time at a time when a predetermined number of sheets are printed after a previous image stabilization operation, the image stabilization operation is not performed, and the image stabilization operation is performed after the predetermined time has elapsed.

Preferably, as the image stabilization operation, a short stabilization operation in which an operation time is short and a long stabilization operation in which the operation time is long are provided, and when the number-of-sheet charging method is selected by the charging method selection unit, after a first predetermined number of sheets has been printed since execution of a previous short stabilization operation, the short stabilization operation is executed again whereas when the time charging method is selected by the charging method selection unit, if the remaining print allowable time of the user is less than a predetermined time at a time when a second predetermined number of sheets has been printed since execution of a previous long stabilization operation, the long stabilization operation is not executed, and the short stabilization operation is executed.

The image forming apparatus according to the present invention, further includes: a print allowance determination portion that determines, according to a state of the apparatus and a remaining amount of a consumable item, whether or not the printing can be performed, where when the time charging method is selected by the charging method selection unit, even if the print allowance determination portion determines that the printing cannot be performed due to lack of the remaining amount of the consumable item, a control condition adjustment unit changes a time when the printing is interrupted according to the print allowable time or the remaining print allowable time by the usage time count unit.

The image forming apparatus according to the present invention, further includes: a toner sensor that detects the remaining amount of a toner; a sheet sensor that detects the remaining number of sheets; and a warning device that prompts the toner and the sheet to be supplied, where when the time charging method is selected by the charging method selection unit, a threshold value for providing a warning for the supply of the toner and the sheet is determined from the print allowable time, a print speed and an average coverage.

The image forming apparatus according to the present invention, further includes: a toner sensor that detects the remaining amount of a toner; a sheet sensor that detects the remaining number of sheets; and a warning device that prompts the toner and the sheet to be supplied, where when the time charging method is selected by the charging method selection unit, a threshold value for providing a warning for the supply of the toner and the sheet is determined from the remaining print allowable time, a print speed in use and an average coverage in use.

BRIEF DESCRIPTION OF THE DRAWINGS

FIG. 5 An example of a screen on which a print allowable time is input in the time charging method in the present invention;

FIG. 13 Another example of the patch images in the long stabilization unit of the present invention;

FIG. 14 An example of a screen that provides a warning of the absence of toner in the time charging method in the present invention;

FIG. 15 A control flowchart that determines a warning threshold value for prompting the supply of a consumable item in the embodiment of the present invention.

DESCRIPTION OF PREFERRED EMBODIMENTS

Although the present invention will be described in further detail below using an embodiment, the present invention is not limited to this embodiment.

Figure 2:
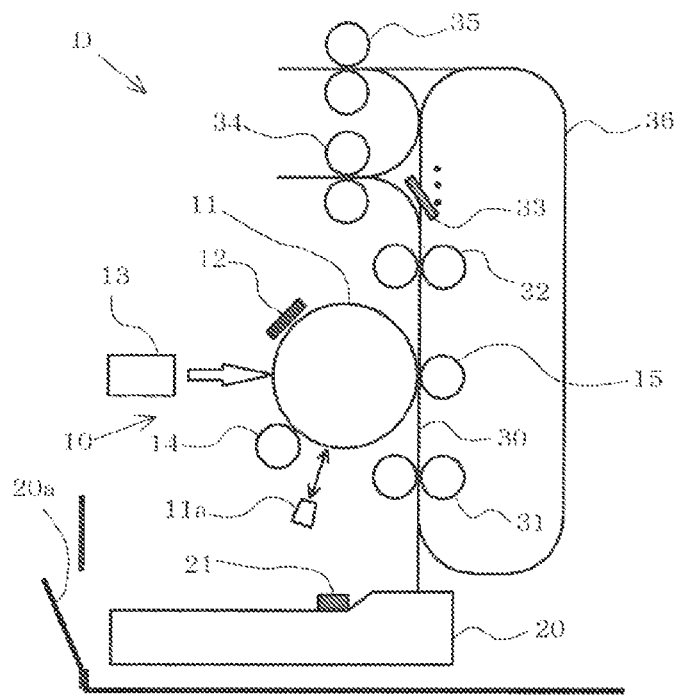
FIG. 2 A basic structure diagram on image formation in an embodiment of the present invention.

FIG. 2 shows a basic configuration of an image forming apparatus D according to the present invention. An image forming unit 10 for forming an image includes a charging device 12, an exposure device 13, a development device 14 and a transfer roller 15 provided around a photosensitive member 11. A sheet that is drawn from a sheet tray 20 one by one and that is guided along a transport path 30 is transported, after the correction of its inclination by a resist roller 31, to a nip portion between the photosensitive member 11 and the transfer roller 15 with timing of the image forming unit 10. Then, the sheet is passed through a fixing device 32 and is ejected from a path switching gate 33 by an ejection roller 34 to the outside of the apparatus. In double-sided printing, a sheet whose front surface is printed is drawn from the path switching gate 33 to the ejection roller 34 or a reverse roller 35, and, immediately before the rear end of the sheet is passed through the nip portion of the ejection roller 34 or the nip portion of the reverse roller 35, the sheet is transported, by the reverse of the ejection roller 34 or the reverse roller 35, to a double-sided circulation path 36 and is transported again to the resist roller 31.

In the image forming unit 10, the outer circumferential surface of the rotated photosensitive member 11 is uniformly charged by the charging device 12. Then, laser light corresponding to image information is applied from the exposure device 13 to the surface of the charged photosensitive member 11 to form an electrostatic latent image. The exposure device 13 is formed with a laser and a polygon mirror for scanning the surface of the photosensitive member 11 with the laser light, and the polygon mirror is rotated by a polygon motor. The electrostatic latent image formed on the photosensitive member 11 is visualized on the surface of the photosensitive member 11 by toner supplied from the development device 14. This toner image is transferred, in the nip portion between the transfer roller 15 and the photosensitive member 11, to the sheet with a voltage applied to the transfer roller 15. Then, the sheet to which the toner image has been transferred is heated and pressurized by the fixing device 32, and thus the toner image is fused and fixed to the sheet.

Figure 3:
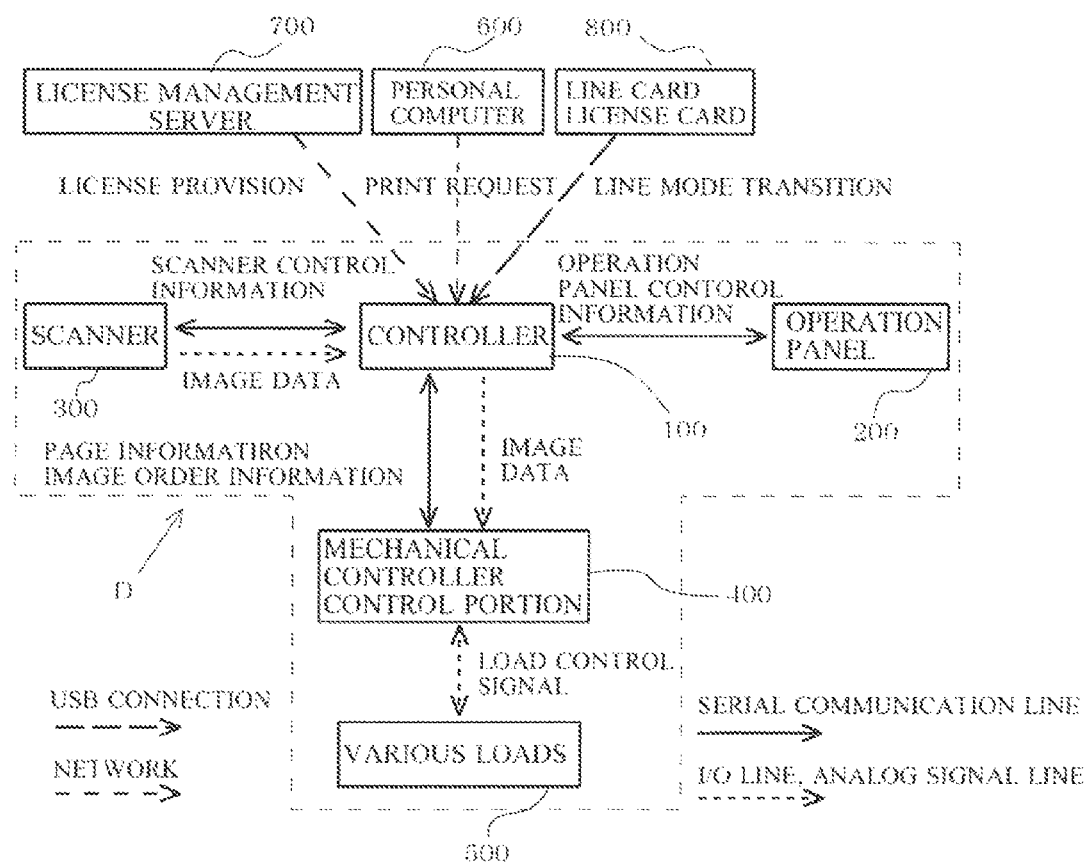
FIG. 3 A control block diagram in the embodiment of the present invention.

In a control block diagram shown in FIG. 3, portions other than a personal computer 600, a license management server 700 and a line card 800 form the control portions of the image forming apparatus D. The blocks other than various types of loads 500 are an electric circuit board that is formed with a CPU, a ROM and a RAM and are connected through a network, a USB, serial communication, an I/O line and an analog signal line. Here, the various types of loads 500 mean various types of rollers in FIG. 2, the laser and the polygon motor of the exposure device 13, the heater of the fixing device 32, the solenoid of the path switching gate 33, the high-voltage power supply of the charging device 12 and the like.

A description will first be given of a case where printing is performed in a printer mode; the personal computer 600 first feeds a print request to a controller 100. The print request is issued in a page description language, and is formed with drawing information and page information (such as a sheet size and a color mode). When the controller 100 receives the print request, the controller 100 transmits the page information to a mechanical controller control portion 400. This page information is issued for each sheet. Each time the mechanical controller control portion 400 receives the page information, the mechanical controller control portion 400 feeds out one sheet.

A sheet ID is attached to the page information; in double-sided printing, the mechanical controller control portion 400 determines the number of sheets in double-sided printing according to the sheet size, and transmits image order information corresponding to the result thereof to the controller 100. For example, the image order information is only issued according to the number of pages in the order of, for example, sheet ID53=front→sheet ID54=front→sheet ID55=front→sheet ID53=back→sheet ID54=back→sheet ID55=back.

The controller 100 converts, according to the image order information, the drawing information included in the print request into image data undergoing bitmap development and stores it in the RAM, and outputs the image data to the mechanical controller control portion 400 in synchronization with a trigger signal from the mechanical controller control portion 400. This image data is printed to the sheet by the image forming unit 10 described above, and the sheet is transported to the outside of the apparatus.

In a case where printing is performed in a copying mode, the controller 100 transmits, according to operation panel control information from an operation panel 200, to a scanner 300, scanner control information for scanning an original document. The scanner 300 scans the original document according to the scanner control information, and outputs the image data to the controller 100. The controller 100 produces the page information while storing the image data in the RAM, and issues it to the mechanical controller control portion 400. The subsequent flow until printing is the same as in the printer mode described above.

Figure 1:
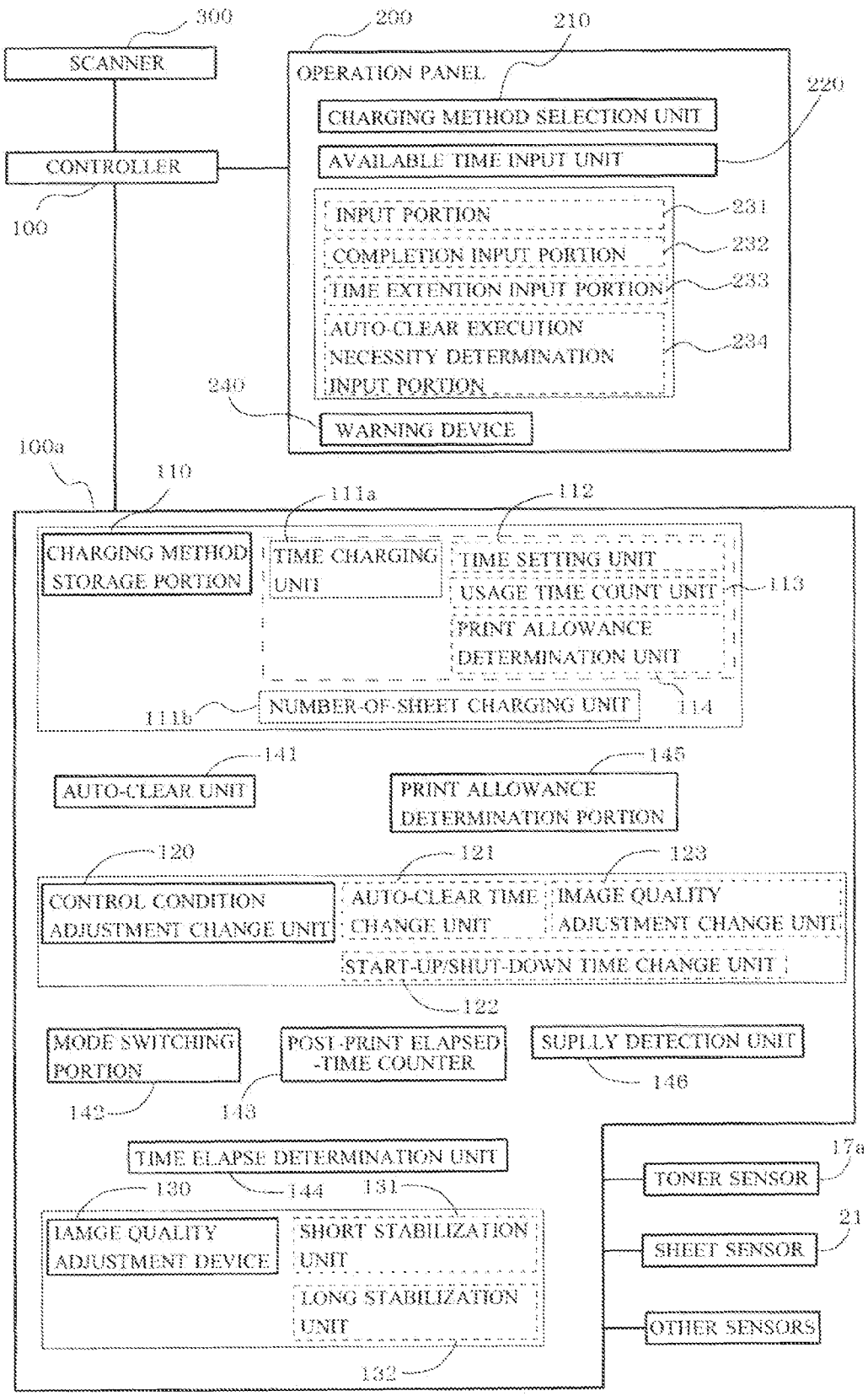
FIG. 1 A control configuration diagram showing an example of a charging system according to the present invention.

A control configuration in a time charging method for determining a charge according to usage time will then be described with reference to FIG. 1. The main control elements are the scanner 300, the controller 100 that integrates and controls an engine portion 100a and the scanner 300 and the operation panel 200 that receives an input operation. The engine portion 100a controls various types of processing conditions in the image formation and is part of the controller 100.

With respect to the operation panel 200, there are a case where a set-up manager receives a request from a user to operate the operation panel 200 and a case where the user actually performs the printing operation. Although in FIG. 1, the manager and the user perform the operation with the same operation panel, for example, a setting may be made such that the manager can perform the operation through a network line from a host personal computer.

The user can select the payment of a charge from two charging methods. Here, it is possible to select from a time charging method in which when a charge corresponding to a time is paid, printing can be performed within the print allowable time regardless of the number of sheets and a number-of-sheet charging method in which a charge for each sheet is fixed and when a charge corresponding to the number of sheets is paid, printing can be performed regardless of printing time. The manager enters a specific manager mode with the operation panel 200, and selects a charging method with a charging method selection unit 210 according to the intension of the user.

Here, when the time charging method is selected, the charging method storage portion 110 of the engine portion 100a stores the charging method, and a time charging unit 111a is started up. Then, when an available time is input according to the amount of advance payment from the available time input unit 220 of the operation panel 200, a print allowable time is set with a time setting unit 112. The operations described above are performed by the manager in the specific manager mode, and thereafter the manager mode is finished, and the subsequent operations are given over to the user. When the number-of-sheet charging method is selected, a number-of-sheet charging unit 111b is started up, and an unillustrated number-of-sheet setting unit sets the number of sheets to be printed.

The time charging unit 111a includes, in addition to the time setting unit 112, a usage time count unit 113 that counts a usage time accumulated from the start of the use and a print allowance determination unit 114 that determines, from a print allowable time and the accumulated usage time, whether the printing operation is allowed or prohibited.

Figure 4:
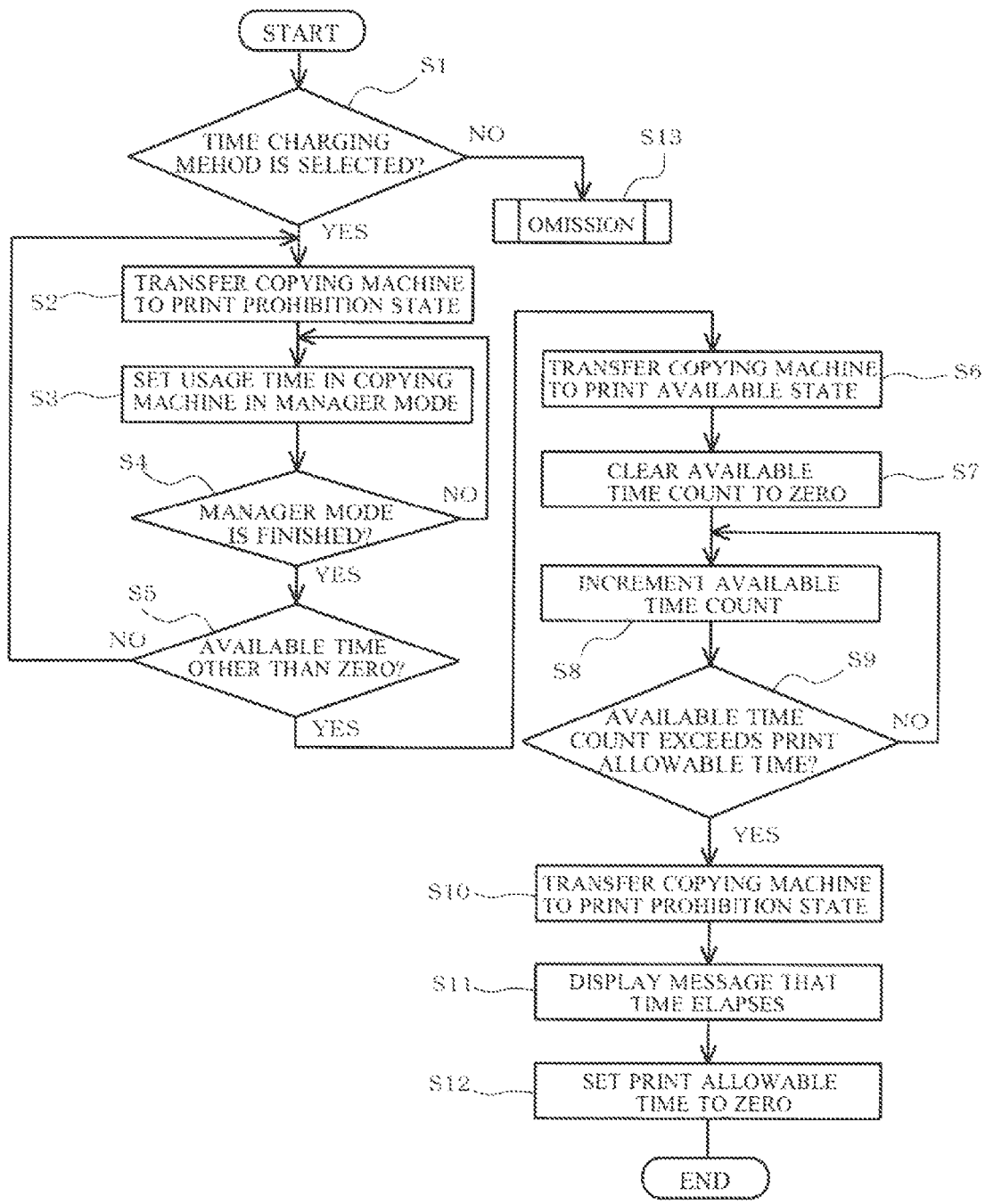
FIG. 4 A control flowchart of a time charging method in the embodiment of the present invention.

FIG. 4 shows a flowchart showing a procedure of use and the details of control in the time charging method. When the user desires the time charging method and sets a usage time, in step S1, the manager enters the manager mode with the operation panel 200 and selects the time charging method with the charging method selection unit 210. Then, in step S2, the printing is temporarily prohibited. In step S3, since a screen formed by an available time input unit 220 as shown in FIG. 5 is displayed on the operation panel 200, the manager inputs a print allowable time corresponding to the amount of advance payment. In the example of the display shown in FIG. 5, it is possible to set up to 65535 in minutes. When in step S4, the manager mode is finished, the available time is checked in step S5, and if the available time is not zero, the printing can be performed in step S6. The determination of the available time described above is made by the print allowance determination unit 114.

Then, in step S7, the usage count of the usage time count unit 113 is cleared to zero. In step S8, the usage time count is incremented every arbitrary control period (for example, 1 second), and thus the usage time is accumulated. Then, in step S9, whether or not the print allowable time is exceeded is determined by the print allowance determination unit 114 every period of the increment of the usage time count. Since the setting of the print allowable time is made every minute, the usage count number of the usage time count unit 113 is converted into a value per minute.

Figure 6:
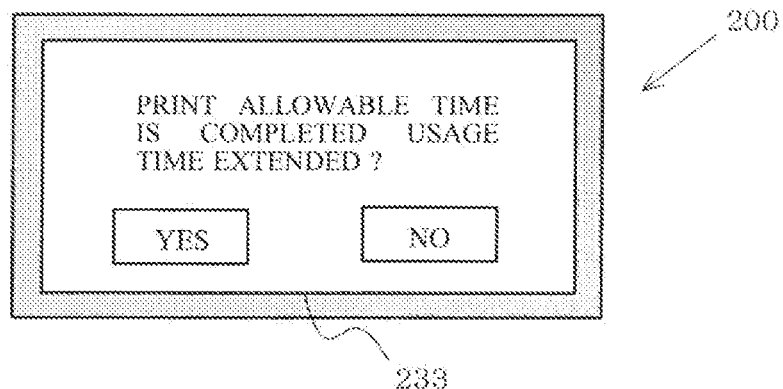
FIG. 6 An example of a screen when the print allowable time is completed in the time charging method in the present invention.

When in step S9, the print allowance determination unit 114 determines that the usage time count exceeds the print allowable time, in step S10, the copying machine is brought into a state where the printing is prohibited. Then, in step S11, information that the print allowable time is completed is displayed on the operation panel 200. FIG. 6 shows an example of a completion message displayed on the display panel 200. Then, in step S12, the print allowable time is set at zero, and thus the control is completed. When in step S1, the time charging method is not selected, the process moves to step S13, and for example, the control using the number-of-sheet charging method is performed.

The control described above is performed, and thus the manager can easily grasp the usage time, with the result that it is possible to check with the subsequent user how much time is left, to tell the user the available time and to encourage the user to use the copying machine. Moreover, since a reservation system is constructed to register the usage start time and the usage time for the subsequent user, the subsequent user can start to use the copying machine at the reservation time without fail.

The image forming apparatus D performs not only the printing operation but also the auto-clear operation described above, a preparation operation for the printing operation, a maintenance operation for maintaining the print quality and the like. In these operations, the printing operation cannot be performed, and it is difficult to predict an operation time and determine whether or not the operation is performed. On the other hand, in the time charging method, it is desirable to perform control such that in the print allowance state, a loss time other than the printing is minimized Hence, in the image forming apparatus according to the present invention, a control condition adjustment unit 120 that is operated when the time charging method is selected is provided in the engine portion 100a, and thus the operation conditions of the apparatus main body that cause the loss time are temporarily changed.

Figure 7:
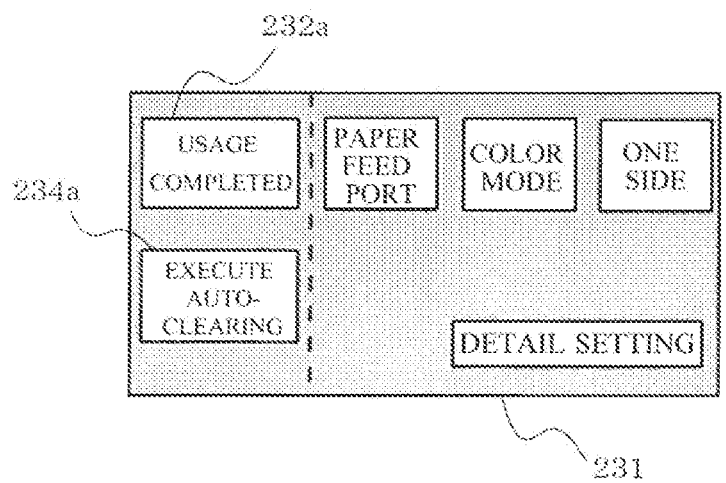
FIG. 7 An example of a screen at the time of start in the time charging method in the present invention.

An example of the auto-clear operation in the present invention will be described. The user sets and inputs print conditions from the input portion 231 of the operation panel 200 as shown in FIG. 7. On the other hand, in the image forming apparatus D, an auto-clear unit 141 which automatically cancels the set print conditions and returns them to the initial values if no operation is performed after the completion of the printing until a given time elapses is included such that the subsequent user is prevented from using the copying machine under the set print conditions to perform undesired printing. In the present invention, within the print allowable time, the auto-clear operation is prevented from being performed such that in the print allowance state, the loss time other than the printing is minimized.

On the other hand, with the assumption that users are changed, the auto-clear operation is performed at the time of the completion of the print allowable time or the auto-clear operation is performed at the time of the start of the print allowable time. When a usage completion button 232a is pressed down on the operation screen shown in FIG. 7, the auto-clear operation may be performed.

However, as shown in FIG. 6, when on the display panel 200 indicating the completion of the print allowable time, a time extension input portion 233 is displayed, and "yes" is pressed down, it is determined that the same user continues to perform the printing, with the result that the auto-clear operation is not performed. When the print allowable time is extended, the user notifies the manager of the fact thereof, and the manager sets the print allowable time corresponding to the extension in the manager mode. In this way, the user can continue to perform the printing under the same print settings.

Furthermore, when the auto-clear execution button 234a of an auto-clear execution necessity determination input portion 234 is pressed down on the operation screen shown in FIG. 7, control may be performed such that even within the print allowable time, the auto-clear operation is performed unless a predetermined time operation is performed.

An example of the preparation operation for the printing operation will then be described. The image forming apparatus D has a standby mode in which a print instruction is waited for in a state where the consumption of the apparatus is reduced, a print preparation mode in which a preparation operation for performing the printing operation in the standby mode, a print allowable mode in which the printing can be performed and a standby preparation mode for returning to the standby mode after a predetermined time has elapsed since the completion of the printing; the mode is switched to any one of the modes by a mode switching portion 142 of the engine portion 100a.

When the image forming apparatus D is not operated, the image forming apparatus D is in the standby mode whereas when the printing is performed, the image forming apparatus D enters the print preparation mode in which preparations such as for starting up the process and increasing the temperature of the fixing device 32 are performed. Then, when the preparations are achieved, the printing can be performed with the print allowable mode maintained.

The operation of starting up the process includes operations such as for repeatedly performing charging and erasing in order to stabilize the surface potential of the photosensitive member 11 and for pressing, in the standby mode, the separate roller portion in order to prevent consumption. In the standby mode, the fixing device 32 is controlled so as to maintain a temperature lower than that at the time of the printing, and when the print instruction is provided, the temperature is increased up to a predetermined temperature. When the printing operation is completed, the mode is transferred to the standby preparation mode, process shut-down processing and the like are performed and the mode is returned to the standby mode. This is done because the operation is performed only with appropriate timing to save energy and increase the life of the apparatus.

When after the completion of the printing operation, the mode is changed from the print allowable mode to the standby mode, the execution is performed after a given time has elapsed since the completion of the printing operation. In order to measure the elapsed time, a post-print elapsed-time counter 143 and a time elapse determination unit 144 are provided.

In the present invention, when the time charging method is selected, and the time charging unit 111a is started up, the control condition adjustment unit 120 is in the operated state, and a start-up/shut-down time change unit 122 within the control condition adjustment unit 120 functions to change the time when the transfer between the modes is performed by the mode switching portion 142. Specifically, when the time charging method is selected, the start-up/shut-down time change unit 122 changes the modes so as to maintain the print allowance state for a long time as compared with the case where the number-of-sheet charging method is selected. For example, the change such as for simplifying the requirement for transfer to the print preparation mode as compared with the normal state or for delaying the execution of the shut-down processing after a predetermined time has elapsed since the completion of the printing is performed.

In the image forming apparatus D, a print allowance determination portion 145 is provided that detects a state where consumable items such as the sheet and the toner are left, the life of the components, the occurrence of a paper jam and other abnormalities to determine whether or not the printing can be performed. Signals of a sheet sensor 21 provided in the sheet tray 20 and a toner sensor 17a provided in the sub-popper 17 of the toner which will be described later and the like are transmitted to the print allowance determination portion 145.

In general, the apparatus starts to transfer from the standby mode to the print preparation mode both through the print allowance determination by the print allowance determination portion 145 and through a print start instruction provided by the user. In the present invention, when the time charging method is selected, the start-up/shut-down time change unit 122 changes the requirement for transfer between the modes by the mode switching portion 142 to transfer to the print preparation mode with early timing.

Figure 8:
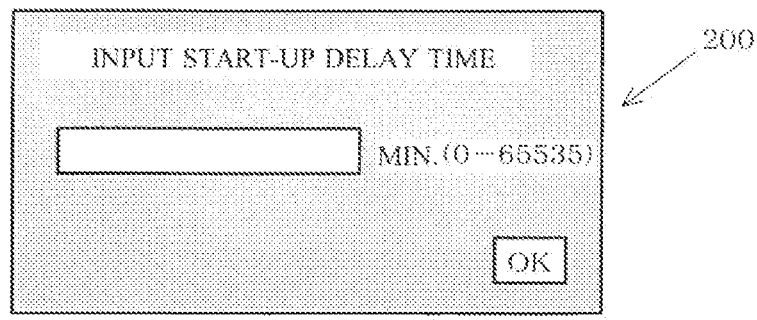
FIG. 8 An example of a screen on which a shut-down delay time is input in the present invention.

For example, from the display of the operation panel 200 shown in FIG. 8, a shut-down delay time can be made to be input. This input operation can be performed by the manager in the manager mode and is stored in the engine portion 100*a*. Even if the input shut-down delay time is set less than a delay time when the time charging method is not selected, the input shut-down delay time is changed to the same time as the delay time when the time charging method is not selected and is set. Even when the delay time is set longer than the remaining print allowable time of the user, the delay time is changed to the same time as the remaining print allowable time and is set. In this way, it is possible to reduce the waiting time of the user and prevent the print allowable mode from being maintained beyond necessity.

Figure 9A:
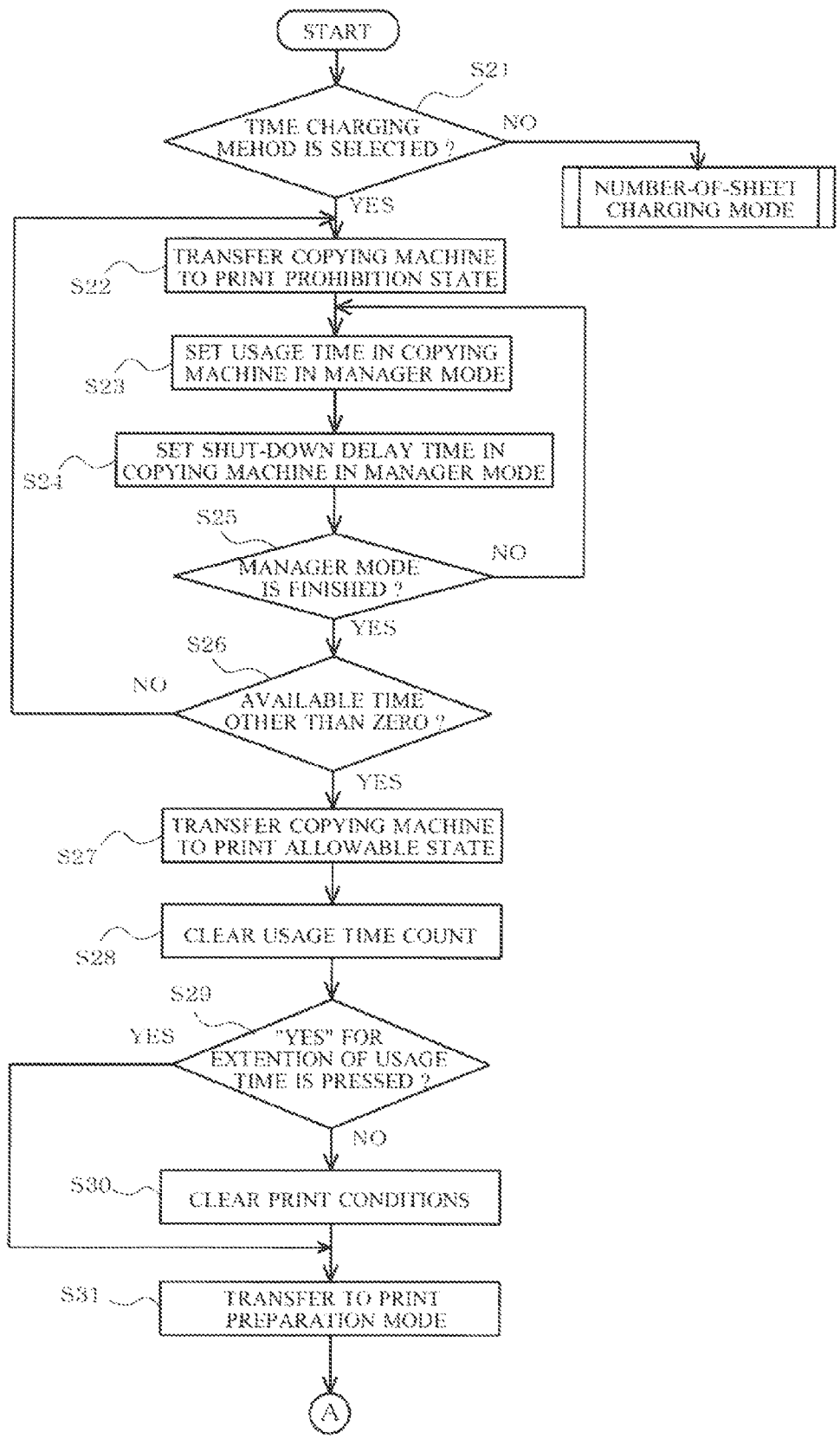
FIG. 9A, 9B A flowchart showing an example of control for reducing a standby state in the present invention.
Figure 9B:
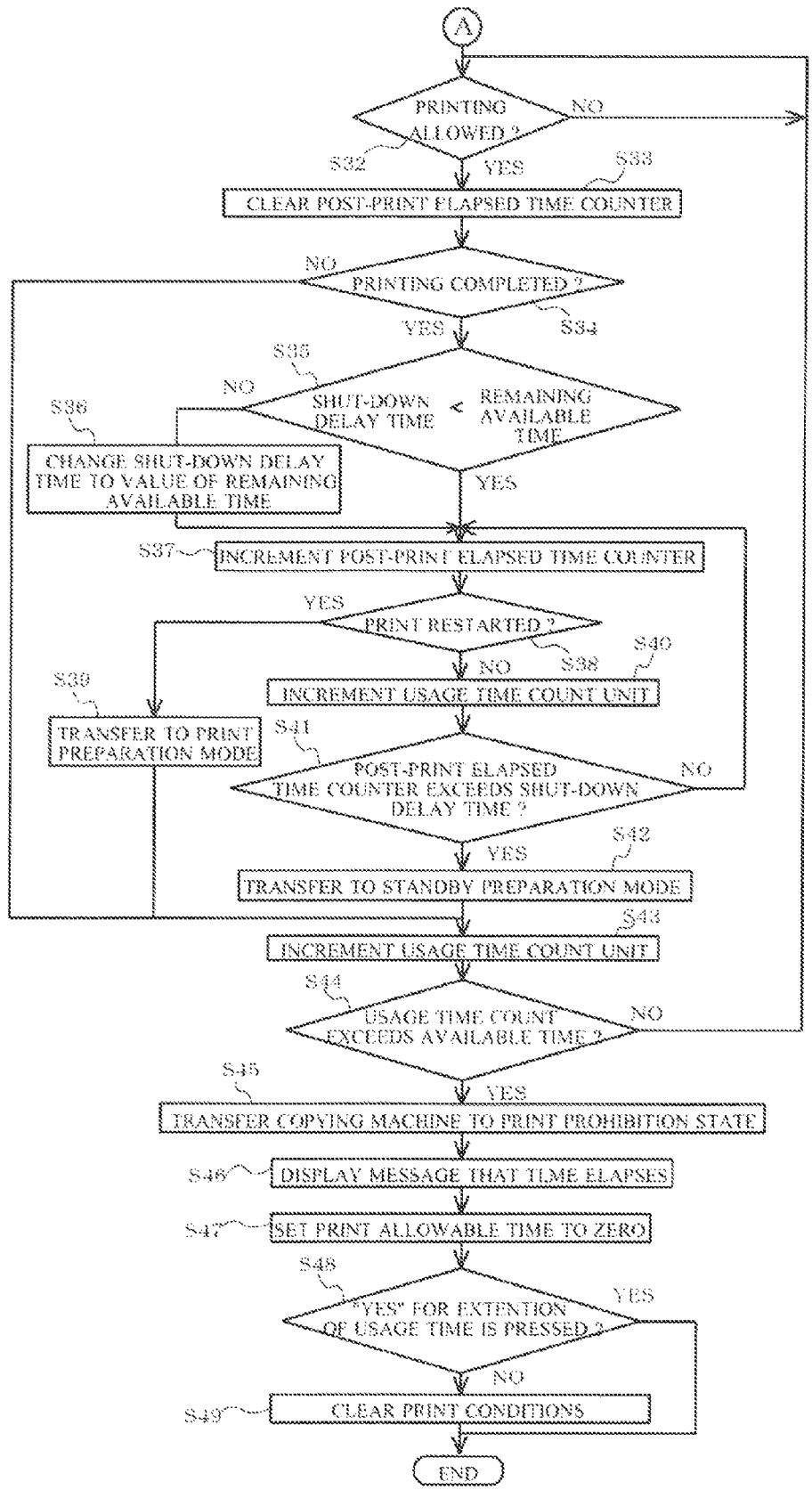

FIG. 9A,9B shows a flowchart indicating an example of control for reducing a standby state. A case where the user copies three bundles of original documents (each of which consists of 10 pages) will be described below as the example. In this flowchart, the printing processing is omitted. The state of the printing processing is determined by a flag. The completion of the printing in step S34, which will be described later, is also determined by a flag.

When the time charging method is first selected, in steps S23 and S24, the usage time and the shut-down delay time are set, and in step S31, the mode is transferred to the print preparation mode. When in step S32, print permission is waited for (here, the usage time is not counted), and the permission is then received, since the process proceeds to "NO" in step S34 and to "NO" in step S44, the usage time count unit is incremented in step S43 while the first original document is being printed, and the process that proceeds to "YES" in step S32, to "NO" in steps S33 and S34 and to "NO" in steps S43 and S44 is repeated.

When the printing of the first original document is completed, in step S34, the printing is determined to be completed, the process proceeds to "YES", the process proceeds to step S35, whether the remaining available time is less than the shut-down time set in step S24 is checked and when the process proceeds to "NO", in step S36, the value of the shut-down delay time is changed, and in step S38, steps S37, S40 and S41 are repeated until the printing of the second original document is started.

When the printed item of the first original document is removed, the second original document is set on an original document stage and a start button is pressed, in step S38, whether the printing is restarted is determined, in step S39, the print preparation is started and the process that proceeds to "YES" in step S32, to "NO" in steps S33 and S34 and to "NO" in steps S43 and S44 are repeated. The transfer to step S39 is performed only when the second original document is set on the original document stage and then the start button is pressed.

When the printing of the second original document is completed, in step S34, the process proceeds to "YES" again, the process proceeds through steps S35 and S36 and thereafter as at the time of the completion of the printing of the first original document, steps S37, S40 and S41 are repeated. Here, if it takes more time to replace the second original document with the third original document, in step S41, the process proceeds to "YES", in step S42, the mode is transferred to the standby preparation mode, thereafter in step S32, the process proceeds to "YES", in steps 33 and 34, the process proceeds to "YES", the process proceeds through steps S35 and S36 and thereafter steps S37, S40 and S41 are repeated. In this state, the copying machine is in the standby preparation mode.

Thereafter, when the third original document is set and the start button is pressed, in step S38, whether the printing is restarted is determined, in step S39, the print preparation is started and the process that proceeds to "YES" in step S32, to "NO" in steps S33 and S34 and to "NO" in steps S43 and S44 are repeated.

When the printing of the third original document is completed, in step S34, the process proceeds to "YES" again, and when in step S35, the remaining available time is less than the shut-down time ("NO"), in step S36, the value of the shut-down delay time is changed to the remaining available time, and then steps S37, S40 and S41 are repeated.

Thereafter, when the count value of the post-print elapsed time reaches the shut-down delay time ("YES" in step S41), though the process proceeds to step S44, since in step S36, the value is adjusted, in step S44, the process is determined to proceed to "YES", the processing in step S45 and the subsequent steps are performed and the process is completed.

When the available time is exceeded during the printing of the third original document, though in step S44, the process is determined to proceed to "YES" where the apparatus is stopped, "YES" in the determination of the extension is pressed, and thus in steps S48 and S29, the print conditions are prevented from being cleared, with the result that when the printing is performed by extending the available time, the printing can be immediately continued without the print conditions being cleared.

Moreover, in the present invention, in a case where the time charging method is selected, even when the print allowance determination portion 145 determines that the printing is prohibited due to lack of the consumable item, if a supply detection unit 146 detects an operation of supplying the consumable item, it is determined that the supply is intended, with the result that the mode is immediately transferred to the print preparation mode to allow the printing. This control is performed by the function of the start-up/shut-down time change unit 122 in the control condition adjustment unit 120.

For example, when the sheet sensor 21 detects lack of sheets in FIG. 2, if it is detected that the paper feed port 20*a* of the sheet tray 20 is opened, the sheet is determined to be supplied, with the result that the mode is immediately transferred to the print preparation mode. In this case, the detection of whether the paper feed port 20*a* is opened or closed functions as the supply detection unit 146.

Figures 10, 11, 12:
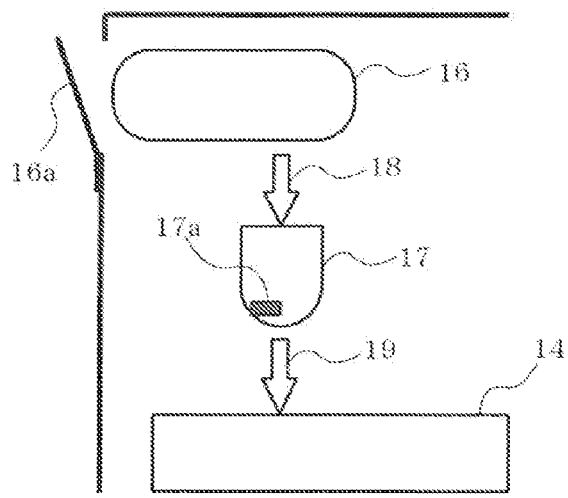
FIG. 10 A configuration diagram showing an example of a path from a toner bottle to a development device in the image forming apparatus.
FIG. 11 An example of patch images in a short stabilization unit of the present invention.
FIG. 12 An example of patch images in a long stabilization unit of the present invention.

In a toner supply mechanism shown in FIG. 10, the toner is passed from a bottle 16 for supplying the toner through a first toner hose 18, a small amount is temporarily stored in the sub-popper 17 and thereafter the toner is supplied through a second toner hose 19 to the development device 14. In the sub-popper 17, the toner sensor 17*a* is provided. The bottle 16 is replaced by opening a toner supply door 16*a*. In the toner supply mechanism described above, when the toner sensor 17*a* detects the lack of the toner and thereafter it is detected that the toner supply door 16*a* is opened, it is determined that supply of the toner is about to be performed, with the result that the mode is immediately transferred to the print preparation mode. As described above, before it is finally confirmed that the cause of the determination of the prohibition of the printing is removed, the movement for removing the cause is detected, and thus the copying machine is transferred to the print allowance state, with the result that the apparatus becomes available earlier.

Even when the print allowance determination portion 145 determines that the printing is prohibited, there is actually a case where a given amount of printing can be performed. Specifically, even when the toner sensor 17a detects that the toner is not present in the sub-popper 17, since the toner is left in the second toner hose 19 and the toner is also left in the development device 14, the printing is prevented from being immediately prohibited. Hence, for example, when the remaining print allowable time for the user is 5 minutes, there may be a case where even if the copying machine is continuously used for 5 minutes without supply of the toner, the toner is not used up. Hence, in the present invention, control is performed such that even when lack of the consumable item such as the toner is detected and the print allowance determination portion 145 determines that the printing is prohibited, the print allowance state is continued with consideration given to the remaining print allowable time. This control is performed by the control condition adjustment unit 120 when the time charging method is selected and the time charging unit 111a is started up.

In the image forming apparatus D, a maintenance operation for maintaining the print quality may be interruptedly performed in the print allowable time. Specifically, in the image forming apparatus D, an image quality adjustment device 130 is incorporated in order to maintain the image quality for a long time and stably. This is done by interrupting the printing when the printing is performed, printing patch images on the photosensitive member 11, reading the images with a reflective photosensor 11a, detecting, for example, inconsistencies in density with a target image and adjusting the parameters of the image formation. The targets to be adjusted include a development voltage, the laser light and power. The reflective photosensor 11a faces the surface of the photosensitive member 11, and between the development device 14 and the transfer roller 15, the reflective photosensor 11a is arranged individually both on the front side and on the back side of FIG. 2.

FIG. 11 shows an example of the patch images for adjusting the maximum image density. Here, Y represents yellow, M represents magenta, C represents cyan and K represents black in colors. Y1 to Y3 and M1 to M3 are read by the sensor on the front side, and C1 to C3 and K1 to K3 are read by the sensor on the back side. Three pieces are made for each of the colors because both the maximum density and halftone characteristics are inspected. For example, in Y1, the maximum density is developed, in Y2, the development voltage is reduced to 80% of the maximum and in Y3, it is reduced to 60%, and thus density variation characteristics for the development voltage are measured, with the result that the development voltage for achieving the maximum density, which is the target, is determined. Then, the development device 14 is adjusted so as to achieve the determined development voltage.

In the image quality adjustment device 130, a short stabilization unit 131 and a long stabilization unit 132 are provided. The short stabilization unit 131 is designed to detect variations in the characteristics of components affecting the image and to correct image parameters, and its adjustment time is short. The long stabilization unit 132 is designed to detect a larger number of patch images, and its adjustment time is long but it is possible to fully perform the image adjustment.

FIGS. 12 and 13 show an example of the patch images when the long stabilization operation is performed. For example, with Y1 to Y4 shown in FIG. 12, the characteristics of the halftone are measured. The halftone characteristics are varied by variations in the characteristics of the photosensitive member and the laser. Although the variations are not found when the number of sheets printed is about a few hundreds of sheets, the characteristics are gently varied when a large number of sheets such as a few thousands of sheets or a few tens of thousands of sheets are printed and it becomes possible to find differences between the 1st sheet and the 10000th sheet. Hence, the laser light is stepwise varied from Y1 to Y4, and thus effects on the halftone characteristics are checked. Then, with Y5 to Y8 in FIG. 13 where a charging voltage is stepwise varied, effects on the halftone caused by variations in the characteristics of the photosensitive member are checked. For the other colors, variations in the characteristics are likewise measured, and thus image adjustment is performed. In this way, the operation conditions of the image forming unit 10 are adjusted such that the optimum halftone can be obtained.

In general, the adjustment operation for the image stabilization is performed by periodically changing the execution of a short stabilization operation and a long stabilization operation with timing shown in Table. 1. The "stabilization unexecuted grace time" of Table 1 indicates a margin time during which the printing can be performed without the image stabilization operation being performed.

TABLE 1

| | Execution time | Stabilization unexecuted grace time |
|---|---|---|
| Short stabilization operation | 200 prints | 15 minutes |
| Long stabilization operation | 3000 prints | 90 minutes |

In the image forming apparatus D of the present invention, when the time charging method is selected, the type and the execution time of the image stabilization operation are changed by a stabilization control unit 123 in the control condition adjustment unit 120 according to the print allowable time and the count time of the usage time count unit 113. With preset timing at which the image stabilization operation is performed, the remaining print allowable time is first checked. For example, even with timing at which the long stabilization operation is originally performed, the long stabilization operation is not performed if the remaining print allowable time is less than 1 hour, and at the time when the present user completes the use, the long stabilization operation is performed. Moreover, even with timing at which the short stabilization operation is originally performed, the short stabilization operation is not performed if the remaining time is less than 10 minutes, and at the time when the present user completes the use, the short stabilization operation is performed. As described above, the time when the short stabilization operation and the long stabilization operation are performed may be delayed because a margin is provided in the value of the accumulated number of sheets printed on which the stabilization operation is performed and the image quality is not significantly affected even if there is some delay.

In a case where the life of the photosensitive member 11 is exceeded or an improper toner is used, the halftone of the image is varied earlier than expected, and when the long stabilization operation is executed, the halftone image quality may be significantly varied before and after the execution. Although the halftone is returned to the original halftone, since the user wants the tone not to vary during a series of printing steps, in such a case, the long stabilization operation is preferably performed after the completion of a series of printing steps.

In addition to the case where the remaining print allowable time is checked to delay the stabilization operation, in a case where the print allowable time is found and it is previously expected that there will be a time when the long stabilization operation is performed halfway through, the long stabilization operation may be performed before the start of the printing. Alternatively, instead of performing the long stabilization operation, the short stabilization operation may be performed. The short stabilization operation is performed, and thus the image quality is stabilized and the image adjustment time is short, with the result that the time during which the printing cannot be performed can be minimized.

In the image forming apparatus D of the present invention, when the time charging method is selected, a threshold value for determining whether or not a warning for prompting the supply of the consumable item is displayed is changed depending on the actual possibility. When in the image forming apparatus D, the remaining amount of consumable item is decreased, a warning device 240 displays a warning as illustrated in FIG. 14 on the operation panel 200. This example is an example that is displayed when the toner sensor 17a detects that the amount of toner becomes less. In the present invention, the threshold value for displaying this warning is changed by making a determination from the possibility that in the print allowable time, it becomes impossible to perform the printing due to lack of the toner.

Since the print allowable time is known, the time until which it becomes possible to perform the printing can be approximately calculated from the productivity (print speed) of the apparatus and the average coverage. For example, when the print allowable time is set at 5 minutes, the print speed of the apparatus is 30 sheets/minute and the average coverage of the apparatus is a usage rate of 80%, the number of sheets to be printed until the completion of the print allowable time is estimated to be 120. FIG. 15 shows a control flowchart in which such a determination is made before the start of the printing.

In step S51, whether or not the toner becomes empty in the print allowable time is determined. In the example described above, when 120 sheets can be printed with the remaining toner, the advance warning is not issued in step S52. On the other hand, when 120 sheets cannot be printed with the remaining toner, the threshold value of the advance warning is changed due to the following consideration. Specifically, when the productivity of the apparatus is high (step S53) and the average coverage of the apparatus is high (step S54), since the time until which the toner becomes empty is short, the threshold value of the advance warning is lowered (step S55), with the result that an interruption is prevented from occurring during the printing because the toner is empty. On the other hand, when the productivity of the apparatus is low (step S53) and the average coverage of the apparatus is low (step S54), since the time until which the toner becomes empty is long, the threshold value of the advance warning is increased (step S55) because there is no possibility that the toner becomes empty during the printing (step S55). In the other cases, specifically, when the productivity of the apparatus is high (step S53) and the average coverage of the apparatus is low (step S54), and when the productivity of the apparatus is low (step S53) and the average coverage of the apparatus is high (step S54), the conventional threshold value is applied as it is.

Figure 16:
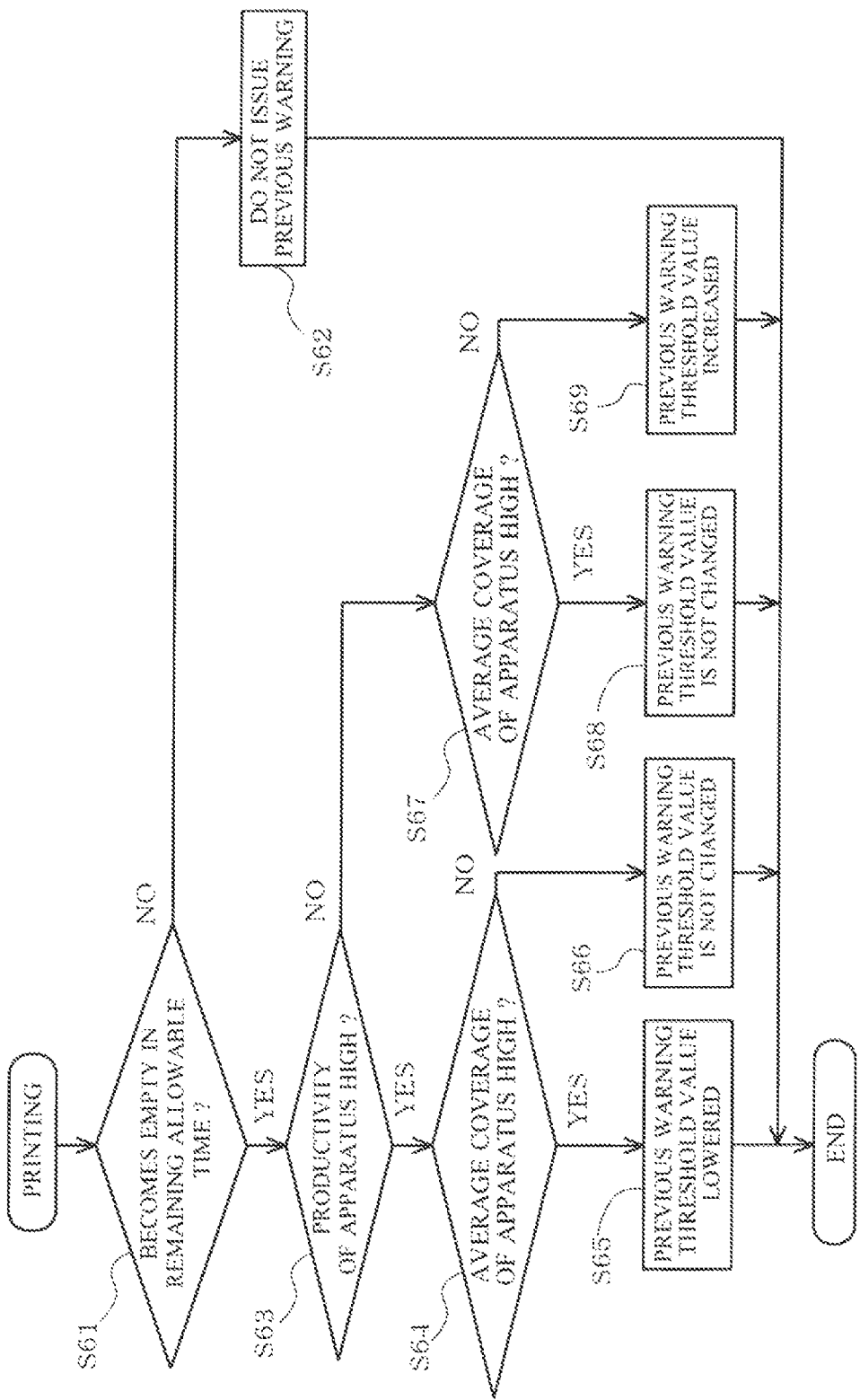
FIG. 16 A control flowchart that changes the warning threshold value for prompting the supply of the consumable item in the embodiment of the present invention.

FIG. 16 shows a flowchart when the threshold value for provision of the advance warning is changed during the printing. This flowchart differs from the flowchart shown in FIG. 15 only in whether the determination is made before the start of the printing or during the printing, and the threshold value is changed, in terms of whether or not the remaining amount of toner is sufficient within the remaining print allowable time, in the same manner as in the flowchart shown in FIG. 15.

As described above, in the image forming apparatus of the present invention, when the time charging method in which the charge is determined by the usage time is selected, the disadvantage that it is impossible to perform the printing in the print allowable time corresponding to the amount of advance payment is minimized. In this way, the disadvantage of the user is minimized, and the manager allows the image forming apparatus to be efficiently utilized by the user. Moreover, since the operational status of the installed image forming apparatus is found as time, it is easy to manage it.

What is claimed is:

1. An image forming apparatus comprising:
   a time setting unit that sets a print allowable time according to an amount of advance payment;
   a usage time count unit that counts a usage time; and
   a print allowance determination unit that determines, from the time setting unit and the usage time count unit, whether printing is allowed or prohibited,
   wherein before the time counted by the usage time count unit reaches the print allowable time, the print allowance determination unit allows the printing to be performed whereas after the time counted by the usage time count unit reaches the print allowable time, the print allowance determination unit prohibits the printing from being performed.

2. The image forming apparatus according to claim 1, further comprising:
   a charging method selection unit that selects a charging method from a number-of-sheet charging method of determining a charging amount according to a number of sheets to be printed and a time charging method of determining the charging amount according to the print allowable time; and
   a control setting unit that sets an operation state of the image forming apparatus,
   wherein when the time charging method is selected by the charging method selection unit, the control setting unit changes the operation state so as to maintain a print allowance state longer than when the number-of-sheet charging method is selected.

3. The image forming apparatus according to claim 2, further comprising:
   an input portion with which a user sets and inputs a print condition; and
   an auto-clear unit that returns the print condition input from the input portion to a predetermined initial value,
   wherein when the time charging method is selected by the charging method selection unit, the auto-clear unit does not execute auto-clearing within the print allowable time.

4. The image forming apparatus according to claim 3, wherein when the time charging method is selected by the charging method selection unit, the auto-clear unit executes the auto-clearing when the print allowable time elapses.

5. The image forming apparatus according to claim 3, wherein when the time charging method is selected by the charging method selection unit, the auto-clear unit executes the auto-clearing at a start of the print allowable time.

6. The image forming apparatus according to claim 3, further comprising:
   a completion input portion with which the user inputs print completion,
   wherein when the time charging method is selected by the charging method selection unit, and the print completion is input from the completion input portion, the auto-clear unit executes the auto-clearing even within the print allowable time.

7. The image forming apparatus according to claim 3, further comprising:
a time extension input portion with which the user inputs an extension of the print allowable time,
wherein when the time charging method is selected by the charging method selection unit, and the extension of the print allowable time is input from the time extension input portion, the auto-clear unit does not execute the auto-clearing within the print allowable time and within the extended print allowable time.

8. The image forming apparatus according to claim 3, further comprising:
an auto-clear execution necessity determination input portion with which the user inputs a determination as to whether or not the auto-clearing needs to be executed within the print allowable time when the time charging method is selected by the charging method selection unit,
wherein when the time charging method is selected by the charging method selection unit, and a determination that the auto-clearing needs to be executed is input from the auto-clear execution necessity determination input portion, the auto-clear unit executes the auto-clearing, even within the print allowable time, after a predetermined time has elapsed since the setting and inputting from the input portion.

9. The image forming apparatus according to claim 2, further comprising:
a print allowance determination portion that determines, according to a state of the apparatus and a remaining amount of a consumable item, whether or not the printing can be performed; and
a mode switching portion that switches a mode to any one of a standby mode in which a print instruction is waited for in a state where consumption of the apparatus is reduced, a print preparation mode in which a preparation operation for performing a printing operation from the standby mode is performed, a print allowable mode in which the printing can be performed and a standby preparation mode for returning to the standby mode after a predetermined time has elapsed since completion of the printing,
wherein when the number-of-sheet charging method is selected by the charging method selection unit, if the print allowance determination portion determines that the printing can be performed and that a user sets and inputs a print condition, the mode switching portion switches the mode to the print preparation mode whereas
when the time charging method is selected by the charging method selection unit, if the print allowance determination portion determines that the printing can be performed, the mode switching portion switches the mode to the print preparation mode.

10. The image forming apparatus according to claim 9, wherein when the number-of-sheet charging method is selected by the charging method selection unit, if at least one of lack of a sheet, an end of a life of the consumable item, a paper jam, a failure and lack of a toner is detected, the print allowance determination portion determines that the printing cannot be performed.

11. The image forming apparatus according to claim 9, further comprising:
a supply detection unit that detects an operation of supplying the consumable item,
wherein when the time charging method is selected by the charging method selection unit, if the print allowance determination portion determines that the printing cannot be performed due to lack of the remaining amount of the consumable item, and the supply detection unit detects the operation of supplying the consumable item, the mode switching portion switches the mode to the print preparation mode.

12. The image forming apparatus according to claim 11, wherein the supply detection unit is a unit that detects an operation of opening a paper feed port after the print allowance determination portion determines that the printing cannot be performed.

13. The image forming apparatus according to claim 11, wherein the supply detection unit is a unit that detects an operation of opening a toner supply port after the print allowance determination portion determines that the printing cannot be performed.

14. The image forming apparatus according to claim 2, further comprising:
a mode switching portion that switches a mode to any one of a standby mode in which a print instruction is waited for in a state where consumption of the apparatus is reduced, a print preparation mode in which a preparation operation for performing a printing operation from the standby mode is performed and a print allowable mode in which the printing can be performed and a standby preparation mode for returning to the standby mode after a predetermined time has elapsed since completion of the printing;
a post-print elapsed-time counter that counts a time which has elapsed since completion of the printing operation; and
a time elapse determination unit that determines, with the post-print elapsed-time counter, whether or not a predetermined time is reached,
wherein when the number-of-sheet charging method is selected by the charging method selection unit, if the time elapse determination unit determines that a first predetermined time has elapsed, the mode switching portion switches the mode to the print preparation mode whereas
when the time charging method is selected by the charging method selection unit, if the time elapse determination unit determines that a second predetermined time has elapsed, the mode switching portion switches the mode to the print preparation mode, and
the second predetermined time is equal to or more than the first predetermined time.

15. The image forming apparatus according to claim 14, wherein the second predetermined time is equal to or less than a difference between the print allowable time and a print completion time.

16. The image forming apparatus according to claim 2, further comprising:
a stabilization control unit that controls an image quality stabilization operation for stabilizing an image quality in a standby state and during the printing,
wherein the control of the image quality stabilization operation by the stabilization control unit differs depending on whether the number-of-sheet charging method is selected or the time charging method is selected.

17. The image forming apparatus according to claim 16,
wherein when the time charging method is selected by the charging method selection unit, the stabilization control unit determines an operation condition of the image quality stabilization operation according to the print allowable time or the time counted by the usage time count unit.

18. The image forming apparatus according to claim 17,
wherein when the number-of-sheet charging method is selected by the charging method selection unit, each time a number of sheets printed reaches a predetermined number of sheets, the image stabilization operation is performed whereas when the time charging method is selected by the charging method selection unit, if the remaining print allowable time of a user is less than a predetermined time at a time when a predetermined number of sheets are printed after a previous image stabilization operation, the image stabilization operation is not performed, and the image stabilization operation is performed after the predetermined time has elapsed.

19. The image forming apparatus according to claim 17,
wherein as the image stabilization operation, a short stabilization operation in which an operation time is short and a long stabilization operation in which the operation time is long are provided, and when the number-of-sheet charging method is selected by the charging method selection unit, after a first predetermined number of sheets has been printed since execution of a previous short stabilization operation, the short stabilization operation is executed again whereas when the time charging method is selected by the charging method selection unit, if the remaining print allowable time of the user is less than a predetermined time at a time when a second predetermined number of sheets has been printed since execution of a previous long stabilization operation, the long stabilization operation is not executed, and the short stabilization operation is executed.

20. The image forming apparatus according to claim 2, further comprising:
a print allowance determination portion that determines, according to a state of the apparatus and a remaining amount of a consumable item, whether or not the printing can be performed, wherein when the time charging method is selected by the charging method selection unit, even if the print allowance determination portion determines that the printing cannot be performed due to lack of the remaining amount of the consumable item, a control condition adjustment unit changes a time when the printing is interrupted according to the print allowable time or the remaining print allowable time by the usage time count unit.

21. The image forming apparatus according to claim 2, further comprising:
a toner sensor that detects a remaining amount of a toner;
a sheet sensor that detects a remaining number of sheets; and
a warning device that prompts the toner and the sheet to be supplied, wherein when the time charging method is selected by the charging method selection unit, a threshold value for providing a warning for the supply of the toner and the sheet is determined from the print allowable time, a print speed and an average coverage.

22. The image forming apparatus according to claim 2, further comprising:
a toner sensor that detects a remaining amount of a toner;
a sheet sensor that detects a remaining number of sheets; and
a warning device that prompts the toner and the sheet to be supplied, wherein when the time charging method is selected by the charging method selection unit, a threshold value for providing a warning for the supply of the toner and the sheet is determined from the remaining print allowable time, a print speed in use and an average coverage in use.

\* \* \* \* \*